United States Patent Office 3,337,480
Patented Aug. 22, 1967

3,337,480
PREPARATION OF CHELATE CATION-EXCHANGE RESINS
Hamish Small, Midland, Mich., assignor to The Dow Chemical Company, Midland, Mich., a corporation of Delaware
No Drawing. Filed May 31, 1966, Ser. No. 553,626
17 Claims. (Cl. 260—2.2)

This application is a continuation-in-part of application S.N. 219,738, filed by Hamish Small on Aug. 27, 1962, and now abandoned.

This invention concerns an improved process for the preparation of chelate-exchange resins by reaction of an insoluble halomethylaromatic resin to introduce active or potentially active chelate-exchange groups. More particularly the process involves using a halomethylaromatic resin containing a limited number of quaternary ammonium or sulfonic groups as the intermediate resin in this process. The hydrophilic groups markedly improve the compatibility of the resin with water-soluble reagents used to introduce chelate-exchange capacity. Also they enhance the operating characteristics of the resulting resin in certain applications.

Ion-exchange resins are often prepared by adding functional ionic groups to an insoluble resin matrix such as a cross-linked polyvinylaromatic resin. Commercial techniques for sulfonation or halomethylation and amination of such resins are highly developed. Amination of halomethylaromatic resins with trimethylamine and other soluble aliphatic amines is generally straightforward.

In the synthesis of more complex ion-exchange resins, a problem frequently occurs in reacting the hydrophobic halomethylaromatic resin with a reagent such as sodium iminodiacetate and similar functional reagents soluble only in water and other polar solvents. The problem involves not only the intrinsic reactivity of the reagents, but also their solubilities. To react with halomethyl groups dispersed within a resin matrix, the functional reagent must diffuse throughout the resin. Such penetration is enhanced by swelling the resin with a solvent in which the reagent is soluble. Yet solvents which swell a hydrophobic halomethylaromatic resin are generally unsuitable for the more polar functional reagents which are soluble in water and other polar hydroxylic solvents. Such polar liquids are quite ineffective in swelling a hydrophobic resin to expose the halomethyl groups beneath the resin surface.

It has now been discovered that by using a halomethylaromatic resin containing a limited number of hydrophilic quaternary ammonium or sulfonic groups distributed throughout the resin matrix, the compatibility of the resin with polar hydroxylic solvents and hence the process for preparing cation-exchange resins by reaction of such a halomethylaromatic resin with a functional reagent is markedly improved. More specifically, this invention is an improved process for the preparation of chelate-exchange resins by reacting a halomethylaromatic resin with a water-soluble functional reagent to introduce a functional chelate-exchange group which employs as an essential element a halomethylaromatic resin having an average of from 0.50 to 1.25 substituent groups per aromatic group which consist essentially of:

(1) From 0.05 to 0.45 hydrophilic methylenequaternary ammonium (I) or sulfonic (II) groups per aromatic group, said hydrophilic groups having the formula:

$$-CH_2NR_1R_2R_3Y \quad (I)$$

or

  (II)

wherein $R_1$, $R_2$ and $R_3$ are independently $C_1$–$C_6$ alkyl, $C_1$–$C_4$ monohydroxyalkyl, or $C_3$–$C_4$ dihydroxyalkyl groups; Y is a monovalent anion, and M is a monovalent cation; and (2) From 0.45–1.20 chloromethyl or bromomethyl groups per aromatic group.

The improved process is illustrated by reaction of a chloromethyl polyvinylaromatic resin and an aqueous solution of a functional reagent, NaZ;

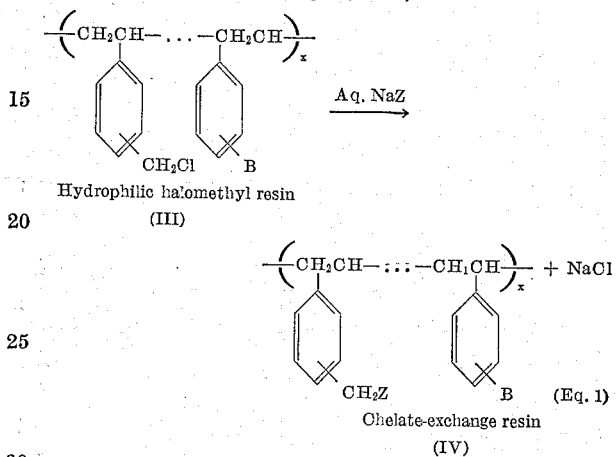

wherein B is a hydrophilic methylenequaternary ammonium or sulfonic group; and Z is an active chelate-exchange group.

It is particularly suited for the synthesis of a sodium iminodiacetate resin IV wherein Z is $-N(CH_2COONa)_2$. The combination of the limited number of quaternary ammonium groups with the iminodiacetate groups yields a chelate resin with improved operating characteristics.

HYDROPHILIC HALOMETHYLAROMATIC RESINS

For a high capacity cation-exchange resin, the intermediate resin should have at least 0.45 and preferably 0.60 or more chloromethyl or bromomethyl groups per aromatic nucleus. The optimum number of hydrophilic substituents within the range from 0.05–0.45 groups per aromatic group depends on the nature of the resin and substituent, but in general about 0.2–0.45 hydrophilic groups per aromatic nucleus is preferred. With more than about 0.45 hydrophilic groups per aromatic group, the number of possible halomethyl groups is usually below a desired level.

The substituent hydrophilic and halomethyl groups should be distributed throughout the resin matrix in an essentially uniform manner to obtain optimum characteristics. Obviously a resin with the hydrophilic groups restricted to a thin surface layer would not swell in a polar solvent to expose the halomethyl groups buried within the resin mass. The essentially uniform distribution of the hydrophilic groups can be verified by microscopic examination of the resin particles. Particles substituted in a non-uniform manner show characteristic demarcation lines when viewed with normal or polarized light.

Suitable hydrophilic halomethylaromatic resins can be obtained in a variety of ways. Advantageously the structural matrix is a commercial copolymer of styrene and from 0.25–20 weight percent divinylbenzene. However resinous polymers of styrene, vinyltoluene, chlorostyrene, or ethylstyrene cross-linked with a monomer such as divinylbenzene, divinyltoluene, a diallyl ester, methylenebis-acrylamide, or ethyleneglycol diacrylate can also be used.

Introduction of the hydrophilic quaternary ammonium or sulfonic groups and the essential halomethyl groups is achieved by conventional techniques. For example, after chloromethylation to introduce about 0.5–1.25 halomethyl groups per aromatic group, the chloromethylaromatic resin can be partially aminated with a tertiary amine of the formula: $NR_1R_2R_3$ wherein $R_1$, $R_2$ and $R_3$ are independently $C_1$–$C_6$ alkyl, $C_1$–$C_4$ monohydroxyalkyl, or $C_3$–$C_4$ dihydroxyalkyl groups to form from 0.05–0.45 methylenequaternary ammonium groups per aromatic group. Suitable tertiary amines include trimethylamine, dimethylaminoethanol, dimethylisopropanolamine, methyldiethanolamine, 1-diethylamine-2,3-propanediol, trimethanolamine and triethanolamine as well as mixtures thereof. The extent of the partial amination is controlled under normal conditions by the amount of amine used.

To promote an essentially uniform partial amination throughout the halomethylaromatic resin, amination should be carried out under mild conditions in the presence of an organic liquid which swells the resin and is miscible with the amine. Amination at 0°–35° C. in the presence of a chlorinated solvent such as methylene chloride or dichloroethane is particularly suitable. Other solvents used in the synthesis of quaternary ammonium anion-exchange resins can also be used. The residual halomethyl content of the partially aminated halomethylaromatic resin is readily determined by standard methods.

Alternately a limited number of sulfonic groups ($-SO_3M$) can be introduced into the aromatic resin by partial sulfonation before or after halomethylation. Usually it is preferable to sulfonate first. Indeed the low-capacity sulfonated polyvinylaromatic cation-exchange resin described by Wheaton and McMahon in U.S. Patent 3,133,030 is quite suitable as the hydrophilic halomethylaromatic resin after chloromethylation. The intermediate sulfonic resin is normally used in salt form after neutralization with a water-soluble base such as sodium carbonate, potassium hydroxide, ammonia or trimethylamine.

Another type of halomethylaromatic resin is a water-insoluble halomethyldiphenyl ether resin such as described by Doedens in U.S. Patent 2,911,380. These resins are condensation polymers of a halomethyldiphenyl ether having an average of from 1.1–4.0 halomethyl groups per diphenyl ether. A particularly useful form is obtained by the spray polymerization of chloromethyldiphenyl ether as described by Raymond and Ball in U.S. Patent 3,240,725. By conversion of a limited number of the residual halomethyl groups to quaternary ammonium groups of Formula I, or by partial sulfonation, the compatibility of these halomethyldiphenyl ether resins with polar hydroxylic solvents is also enhanced.

Choice of a partially aminated or partially sulfonated halomethylaromatic resin as an intermediate in the synthesis of the chelate-exchange resin is dependent on the properties desired in the final resin. The hydrophilic methylenequaternary ammonium or sulfonic groups will influence the chelate-exchange properties of the resin. Generally partial amination is preferred both because of process simplicity and the resin properties.

CHELATE-EXCHANGE RESINS

To convert the intermediate hydrophilic halomethylaromatic resin into the desired chelate-exchange resin, the halomethyl groups are reacted in a polar hydroxylic solvent with a functional reagent to introduce active or potentially active chelate-exchange groups (cf. Equation 1).

As used herein the term "polar hydroxylic solvent" refers to such solvents as water, $C_1$–$C_8$ aliphatic mono- and polyhydric alcohols including methanol, ethanol, propylene glycol, 1,4-butanediol and lower monoalkyl ethers as esters of $C_2$–$C_8$ polyhydric alcohols as well as mixtures thereof. Because of the diversity of the reagents which can be used, no one polar hydroxylic solvent will be optimum for all systems. Judicious choice must be made based on properties of the particular reagent and intermediate resin. For many systems water, methanol, ethanol, isopropanol or mixtures thereof are satisfactory.

The term "functional reagent" refers to a reagent which through formation of a new covalent bond with a benzylic carbon can introduce into a halomethylaromatic resin an active or potentially-active chelate-exchange group. An active chelate-exchange group is a group which when present in an insoluble resin gives the resin the property of combining with certain metal special to form highly stable complexes or chelates. A "potentially-active" chelate-exchange group includes nitriles, esters, amides and anhydrides of amino or thio carboxylic acids which may be converted by simple hydrolysis into an active chelate-exchange group.

Typical functional reagents useful in the present process include amino acids such as glycine, iminodiacetic acid, phenylalanine and water-soluble salts thereof; thioacids as mercaptosuccinic acid, glycollic acid and water-soluble salts thereof; aminonitriles as diethylaminoacetonitrile as well as esters of these amino or thio acids which can be hydrolyzed to yield an active chelate group. Still other suitable reagents will be apparent to those skilled in the art.

More specifically the term "functional reagent" refers to a reagent characterized by: (1) a structure which provides a chelate-exchange group, (2) a solubility of at least 5 percent in a polar hydroxylic solvent, and (3) a reactivity such that when mixed with a stoichiometric amount of benzyl chloride in aqueous alcohol at 20–100° C. the reagent will displace at least 5 mole percent of the chloride in 48 hours.

To achieve high yields and reaction rate, an excess of the functional reagent is generally desirable, e.g. about 1.2 to 5 equivalents of the functional inorganic salt based on the halomethyl content of the intermediate resin. The reaction of the intermediate halomethylaromatic resin and the functional reagent is normally run at about 50–120° C. for a suitable time, usually 2 to 48 hours. The reactions are generally conducted at atmospheric pressure, but a moderate elevated or reduced pressure can be used if desired.

CHELATE RESIN

The present process is particularly suited for the preparation of a chelate resin from a partially aminated halomethylaromatic resin by introduction of a methyleneamino acid of the Formula V:

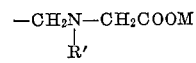

wherein R′ is —H or —$CH_2COOM$ and M is a monovalent cation such as $H^+$, $Na^+$, $K^+$ or $NH_4^+$. Preferably the chelate resin contains about 0.2–0.45 quaternary ammonium and 0.45–1.05 iminodiacetate

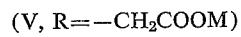

groups per aromatic group. In terms of the total number of substituent groups, this preferred resin contains from 20–45% quaternary ammonium and 55–80% iminodiacetate groups.

Not only do the limited number of methylenequaternary ammonium groups facilitate addition of the functional iminodiacetate groups, but they also affect to a significant degree the operating characteristics of the resulting chelate resin. This is shown for example by the data in Table 1 obtained using a column of iminodiacetate resin prepared from a chloromethylated styrene-divinylbenzene (DVB) resin with a varying quaternary ammonium content to remove nickel from an aqueous solution.

TABLE 1.—NICKEL REMOVAL WITH IDA RESIN

| Run | Percent Quaternary Ammonium [1] | Percent IDA [2] | Ni++ Breakthrough |
|---|---|---|---|
| 1-1 | 0 | 100 | 2.5 bed volumes. |
| 1-2 | 20 | 80 | 7.5 bed volumes. |
| 1-3 | 40 | 60 | 12.5 bed volumes. |
| 1-4 | 40 | [3] 60 | 13.2 bed volumes. |

[1] Based on initial chloromethyl content.
[2] By difference after using excess Na₂IDA.
[3] By hexamethylenetetramine-chloroacetic acid route.

That the quaternary ammonium groups are involved in the enhanced nickel removal is confirmed in Run 1-4 wherein the iminodiacetate groups were introduced by an alternate method involving reaction of the partially aminated resin with hexymethylenetetramine and hydrolysis to the corresponding benzylamine as described in British Patent 859,282 followed by carboxymethylation with chloroacetic acid as described by Morris in U.S. Patent 2,888,441.

*Example 1.—IDA resin via partial amination*

A. A slurry of 80 parts (0.76 mole) of 50–100 mesh styrene-divinylbenzene beads (1% divinylbenzene) and 800 parts of chloromethyl ether was refluxed for two hours after adding 60 parts of anhydrous zinc chloride. The recovered chloromethylated resin containing an average of 1.00 —$CH_2Cl$/aromatic group was slurried in 460 parts of methylene chloride and cooled to about 10° C. Then 13.6 parts (0.153 mole; 20 mole percent based on —$CH_2Cl$ content of the resin) of dimethylaminoethanol was added. Amination was carried out by stirring the resin slurry for one hour at about 10° C. and then for one hour at reflux. After cooling and washing with methanol, 217 parts of wet resin (59% solids) containing 0.80 residual —$CH_2Cl$ groups/aromatic group was recovered.

The wet partially aminated resin was slurried with 185 parts of methanol and added to a hot solution of 227 parts (0.82 mole) sodium iminodiacetate monohydrate in 146 parts of water. The mixture was stirred at reflux for four hours, cooled, and the resulting resin isolated. After thorough washing with water, about 540 parts of wet sodium iminodiacetate resin was obtained. The resin had a water content of 68% and a chelating capacity of 0.615 mmole $Cu^{++}$/g. wet resin or 1.92 mmoles $Cu^{++}$/g. dry resin. The copper capacity which is equivalent to the chelate exchange functionality of the resin, is determined by loading a resin sample with a cuprammonium sulfate solution. Then the copper retained by the resin is eluted with dilute sulfuric acid and determined by iodometric titration.

B. A slurry of chloromethylated resin prepared from 91 parts (0.88 mole) of the styrene-divinylbenzene (1% DVB) as described in Example 1A and containing 0.81 mole of —$CH_2Cl$ (0.92 mole/aromatic group) in methylene chloride was aminated with 44 parts (0.179 mole; 30 mole percent on —$CH_2Cl$) of 24% aqueous trimethylamine at 18° C. After stirring at about 18° C. for an hour, the mixture was refluxed for another hour. The partially aminated resin was isolated, washed and then reacted with excess sodium iminodiacetate as described in Example 1A. There was obtained 538 parts of iminodiacetate resin having a dry weight capacity of 1.92 mmoles $Cu^{++}$/g. and a moisture content of 68.5%.

In subsequent runs partial amination with aqueous trimethylamine was carried out at 25–40° C. Using an intermediate resin containing 30 mole percent quaternary trimethylammonium groups based on initial chloromethyl content and excess sodium iminodiacetate, an IDA resin with 68–72% water and a dry weight capacity of 1.87–2.08 mmoles $Cu^{++}$/g. is readily prepared.

C. A partially aminated chloromethylaromatic resin prepared as described in Example 1B from 80 parts (0.76 mole) of styrene-divinylbenzene resin (1% DVB) by chloromethylation (0.92 $ClCH_2$—/aromatic group) and amination with 40 percent of the theoretical trimethylamine based on chloromethyl content of the resin was slurried with 590 parts methylene chloride and 87 parts methanol. Then 168 parts (1.2 moles) of hexamethylenetetramine was added and the mixture refluxed at 37–40° C. for 3 hrs. The resulting resin was recovered by decantation, washed with water and then methanol. It was then refluxed 3 hours with 395 parts of methanol and 296 parts of concentrated hydrochloric acid. The aqueous phase was removed and the water-swollen resin added to a solution of 372 parts (3.2 moles) of sodium chloroacetate, 74 parts (1.85 moles) NaOH and 480 parts of water. After 3 hrs. at reflux, 736 parts of wet IDA resin were recovered. The resin which contained both quaternary ammonium and iminodiacetate functional groups had a water content of 75% and a dry weight chelate capacity of 1.61 mmoles $Cu^{++}$/g. Its utility in removing nickel from an aqueous solution containing 100 p.p.m. nickel is shown above in Table 1.

*Example 2.—Process variables*

A series of runs were made using the general process of Example 1A to examine process variables. Except where indicated the intermediate partially aminated resin was prepared from a styrene-divinylbenzene resin (1% DVB) containing about 0.92–1.00 chloromethyl groups per aromatic group aminated to contain about 0.2 quaternary ammonium groups per aromatic group. Excess sodium iminodiacetate in 70% aqueous methanol was used as the functional reagent.

A. As shown in Table 2, 50–70 percent aqueous methanol is a particularly satisfactory solvent for this process. Water alone is unsatisfactory because of parasitic attack by the solvent on the chloromethyl groups.

TABLE 2.—AQUEOUS METHANOL COMPOSITION

| Resin No. | Solvent Wt. percent MeOH | D.W.C.[1] mmoles $Cu^{++}$/g. | Moisture Content, Percent |
|---|---|---|---|
| 2-1 | 0 | 0 | 43.4 |
| 2-2 | 17.4 | 0.97 | 44.7 |
| 2-3 | 33 | 1.42 | 57.7 |
| 2-4 | 51 | 2.09 | 71.5 |
| 2-5 | 70 | 2.08 | 70.0 |
| 2-6 | 80 | 0.79 | 48.0 |
| 2-7 | 100 | 0.53 | 42.3 |

[1] D.W.C.—dry weight capacity.

B. The degree of partial amination must be balanced against the number of residual —$CH_2Cl$ groups available for introduction of other functional groups. Table 3 shows that an intermediate resin with about 0.2 to 0.3 quaternary ammonium groups/aromatic group is optimum in terms of dry weight capacity of the IDA resin.

TABLE 3.—DEGREE OF AMINATION

| Resin No. | QN+/Ar [1] | D.W.C. mmoles $Cu^{++}$/g. | Moisture Content, Percent |
|---|---|---|---|
| 3-1 | 0.15 | | 51 |
| 3-2 | 0.20 | 2.08 | 70 |
| 3-3 | 0.30 | 2.00 | 79 |
| 3-4 | 0.40 | 1.62 | 81 |

[1] Quaternary ammonium groups/aromatic group.

C. In general higher yields and capacities are obtained with conventional polyvinylaromatic resins having a low degree of cross-linking (percent DVB).

TABLE 4.—RESIN CROSS-LINKING

| Resin No. | DVB | D.W.C. mmoles $Cu^{++}/g.$ | Moisture Content, Percent |
|---|---|---|---|
| 4-1 | 0.5 | 2.36 | 85 |
| 4-2 | 1 | 2.08 | 70 |
| 4-3 | 4 | 1.02 | 43.5 |
| 4-4 | 8 | 0.14 | 24 |

D. To insure complete reaction of the residual chloromethyl groups excess sodium iminodiacetate is desirable. Table 5 indicates that 1.5–2.0 moles of IDA based on residual chloromethyl content is adequate.

TABLE 5.—EXCESS IMINODIACETIC ACID

| Resin No. | Mole Ratio IDA/-CH$_2$Cl | D.W.C. mmoles $Cu^{++}/g.$ | Moisture Content, percent |
|---|---|---|---|
| 5-1 | 10 | 2.06 | 71 |
| 5-2 | 3.8 | 1.90 | 69 |
| 5-3 | 2.25 | 1.92 | 69 |
| 5-4 | 1.5 | 1.83 | 69 |
| 5-5 | 1.14 | 1.59 | 67 |

*Example 3.—IDA resin via partial sulfonation*

A slurry of 40 parts (0.38 mole) of styrenedivinylbenzene resin (0.75% DVB) in 520 parts of methylene chloride was cooled in a Dry Ice bath. Then 8.8 parts (0.075 mole; 20 mole percent) of chlorosulfonic acid was added to the stirred slurry and the mixture allowed to warm gradually to room temperature over a period of 16 hours. The partially sulfonated polyvinylaromatic resin was isolated, washed thoroughly with methanol and then chloromethyl methyl ether. Then it was refluxed for 2 hours with 400 parts of chloromethyl methyl ether and 30 parts anhydrous zinc chloride to obtain a sulfonated halomethylaromatic resin containing about 0.20 sulfonic and 0.80 chloromethyl groups per aromatic group.

After rinsing with methanol this intermediate resin was refluxed for 4 hrs. with a solution of 113 parts (0.41 mole) sodium iminodiacetate monohydrate in 92 parts of methanol and 73 parts of water. The recovered IDA resin had a water content of 30% with a total dry weight copper capacity of 1.1 mmoles $Cu^{++}/g.$ However 0.3 mole $Cu^{++}/g.$ is present as the copper sulfonate salt and is displaced from the resin by aqueous sodium nitrate. The residual chelated copper is removed only by more vigrous treatment with dilute sulfuric acid.

*Example 4.—Other resins via partial amination*

A. Using a quaternary ammoniun resin similar to that described in Example 1 containing about 0.20–0.25 quaternary ammonium groups/aromatic group, a variety of other functional groups were introduced into the resin by reaction of an appropriate nucleophilic functional reagent in a polar solvent, generally aqueous alcohol. Table 6 presents data for a number of such resins indicating the general operability of the process. Optimum conditions for each reagent were not determined.

TABLE 6.—OTHER RESINS VIA PARTIAL AMINATION

| Reagent | D.W C. mmoles $Cu^{++}/g.$ | Moisture Content, Percent |
|---|---|---|
| Iminodiacetic Acid | 2.08 | 70 |
| Phenylalanine | 0.274 | 39 |
| Isoleucine | 0.43 | 39 |
| Glycine | Low | |
| Aspartic Acid | 0.26 | 44 |
| Mercaptoacetic Acid | 0.72 | 34 |
| Mercaptosuccinic Acid | 0.89 | 61 |

B. As a general test of operability in the present process, the reactivity of a functional reagent is determined with benzyl chloride. Thus to 0.25 ml. (2.18 mmoles) of benzyl chloride in 25 ml. of 65% aqueous ethanol is added about 2.18 mmoles of the functional reagent and the mixture is shaken at room temperature for 17.5 hours. After diluting with 25 ml. of aqueous ethanol and acidifying with excess dilute sulfuric acid, the reactant mixture is titrated potentiometrically for chloride ion. A correction is made for the slight reaction of benzyl chloride with the aqueous alcohol.

Data on the reactivity of several functional reagents are given in Table 7. Ammonia is included in Table 7 as a point of reference.

TABLE 7.—REACTIVITY OF FUNCTIONAL REAGENTS WITH BENZYL CHLORIDE

| Reagent | Mmoles | Percent Reaction [1] |
|---|---|---|
| Isoleucine | 2.29 | 51 |
| Sodium Iminodiacetate | 2.27 | 8.4 |
| p-Aminoacetophenone | 2.22 | 13 |
| Ammonia | 2.40 | 6 |

[1] Mole percent benzyl chloride reacted with reagent.

I claim:
1. In a process for the preparation of a chelate resin by reacting an insoluble halomethylaromatic resin with a water-soluble functional reagent to bond a chelate-exchange group to the aromatic resin, the improvement which comprises reacting:
 (A) A halomethylaromatic resin having an average of from 0.50 to 1.25 substituent groups per aromatic group, said substituents consisting essentially of:
  (1) From 0.05 to 0.45 hydrophilic methylene-quaternary ammonium (I) or sulfonic (II) groups per aromatic group, said hydrophilic groups having the formulas:

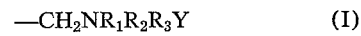

$$-CH_2NR_1R_2R_3Y \qquad (I)$$

or

$$-SO_3M \qquad (II)$$

wherein
   $R_1$, $R_2$ and $R_3$ are independently $C_1-C_6$ alkyl $C_1-C_4$ monohydroxyalkyl or $C_3-C_4$ dihydroxy alkyl groups;
   Y is a monovalent anion which does not hinder reaction of the residual halomethyl groups; and M is a monovalent ammonium or alkali metal cation; and
  (2) From 0.45–1.20 chloromethyl or bromomethyl groups per aromatic group; with
 (B) A solution of a water-soluble functional reagent in a polar hydroxylic solvent selected from the group consistnig of water, $C_1-C_8$ aliphatic mono- and polyhydric alcohols, lower monoalkyl ethers and esters of $C_2-C_8$ polyhydric alcohols, and mixtures thereof, said functional reagent being characterized by: (1) a structure which provides a chelate exchange group, (2) a solubility of at least 5 percent in said polar hydroxylic solvent, and (3) a reactivity such that when mixed with a stoichiometric amount of benzyl chloride in aqueous alcohol at 20–100° C. the reagent will displace at least 5 mole percent of the chloride in 48 hours; to incorporate in the aromatic resin an active chelate-exchange group or a group selected from the group consisting of nitriles, esters, amides and anhydrides of amino or thiocarboxylic acids which can be converted into an active chelate-exchange group by simple hydrolysis.

2. The process of claim 1 wherein the hydrophilic group is a methylenedimethyl-$\beta$-hydroxyethyl ammonium group.

3. The process of claim 1 wherein the hydrophilic group is a methylenetrimethyl ammonium group.

4. The process of claim 1 wherein the halomethyl-aromatic resin is a chloromethylated polyvinylaromatic resin containing from 0.05–0.45 methylenequaternary ammonium groups per aromatic group.

5. The process of claim 1 wherein the halomethyl-aromatic resin is a water-insoluble polymer of chloromethyldiphenyl ether containing from 0.05–0.45 methylenequaternary ammonium groups per aromatic group.

6. The process of cliam 1 wherein the halomethyl-aromatic resin is a water-insoluble sulfonated polyvinylaromatic resin containing from 0.05–0.45 sulfonic and 0.45–1.20 chloromethyl groups per aromatic group.

7. The process of claim 4 wherein the functional reagent is an aminoacid or water-soluble salt thereof.

8. The process of claim 4 wherein the functional reagent is sodium iminodiacetate.

9. The process of claim 4 wherein a water-insoluble polyvinylaromatic resin containing 0.2–0.45 methylenequaternary ammonium groups and 0.45–1.05 chloromethyl groups is reacted with excess sodium iminodiacetate in aqueous alcohol to yield a chelate-exchange resin having a dry weight capacity of at least 0.50 mmole $Cu^{++}/g$.

10. The chelate-exchange resin prepared by the process of claim 9.

11. The process of claim 4 wherein the functional reagent is mercaptosuccinic acid or a water-soluble salt thereof.

12. A chelate-exchange resin consisting essentially of a water-insoluble aromatic resin matrix having substituted thereon from 0.50–1.25 substituent groups per aromatic group, said substituents consisting essentially of:
(A) From 0.05–0.45 hydrophilic methylenequaternary ammonium (I) or sulfonic (II) groups per aromatic group, said hydrophilic groups having the formulas:

$$-CH_2NR_1R_2R_3Y \quad (I)$$

or $$-SO_3M \quad (II)$$

wherein
$R_1$, $R_2$, and $R_3$ are independently $C_1$–$C_6$ alkyl, $C_1$–$C_4$ hydroxyalkyl or $C_3$–$C_4$ dihydroxyalkyl groups;

Y is a monovalent anion which does not hinder reaction of the residual halomethyl groups, and M is a monovalent ammonium or alkali metal cation; and
(B) From 0.45–1.20 active chelate-exchange groups per aromatic group or from 0.45–1.20 potentially active chelate-exchange groups per aromatic group said potentially active chelate-exchange groups being selected from the group consisting of nitriles, esters, amides and anhydrides of amino or thio carboxylic acids which can be converted into active chelate-exchange groups by simple hydrolysis.

13. The chelate-exchange resin of claim 12 wherein the chelate-exchange group is a methyleneamino acid group of the formula:

$$-CH_2N(R')-CH_2COOM$$

wherein R' is —H or —$CH_2COOM$, and M is a monovalent cation.

14. The chelate-exchange resin of claim 13 wherein the aromatic resin is a polyvinylaromatic resin.

15. The chelate-exchange resin of claim 14 wherein the hydrophilic group is a methylenequaternary ammonium group.

16. The chelate-exchange resin of claim 15 wherein the chelate-exchange groups are methylene-iminodiacetate groups.

17. The chelate-exchange resin of claim 15 containing 0.2–0.45 methylenetrimethyl ammonium and 0.45–1.05 methyleneiminodiacetate groups per aromatic group and having a dry weight capacity of at least 0.50 mmoles $Cu^{++}/g$.

References Cited
UNITED STATES PATENTS

| | | | |
|---|---|---|---|
| 2,875,162 | 2/1959 | Morris | 260—2.2 |
| 2,888,441 | 5/1959 | Morris | 260—2.1 |
| 3,037,945 | 6/1962 | Morris | 260—2.1 |

WILLIAM H. SHORT, *Primary Examiner.*

C. A. WENDEL, M. GOLDSTEIN, *Assistant Examiners.*

UNITED STATES PATENT OFFICE

CERTIFICATE OF CORRECTION

Patent No. 3,337,480                        August 22, 1967

Hamish Small

It is hereby certified that error appears in the above numbered patent requiring correction and that the said Letters Patent should read as corrected below.

Column 2, lines 22 to 29, for that portion of the formula reading "$-CH_1CH\!\!-\!\!)_x$" read -- $-CH_2CH\!\!-\!\!)_x$ --; column 4, line 1, for "as" read -- and --; line 14, for "special" read -- species --; column 7, line 48, for "mole" read -- mmoles --.

Signed and sealed this 3rd day of December 1968.

(SEAL)
Attest:

Edward M. Fletcher, Jr.                      EDWARD J. BRENNER
Attesting Officer                             Commissioner of Patents